United States Patent
Nakamura

[19]

[11] Patent Number: 6,071,018

[45] Date of Patent: Jun. 6, 2000

[54] FILM DRIVE MECHANISM

[75] Inventor: Ikushi Nakamura, Sakai, Japan

[73] Assignee: Minolta Co., Ltd., Japan

[21] Appl. No.: 09/152,991

[22] Filed: Sep. 14, 1998

[30] Foreign Application Priority Data

Sep. 17, 1997 [JP] Japan .................................. 9-251876

[51] Int. Cl.[7] .................................................. G03B 1/00
[52] U.S. Cl. .......................................................... 396/418
[58] Field of Search .................................... 396/387, 411, 396/418

[56] References Cited

U.S. PATENT DOCUMENTS 5,262,810  11/1993  Yoshino et al. ...................... 354/173.1
5,689,744  11/1997  Kaihara .................................. 396/411

FOREIGN PATENT DOCUMENTS 62-157018   7/1987  Japan .
6-317832   11/1994  Japan .

Primary Examiner—Howard B. Blankenship
Attorney, Agent, or Firm—Morrison & Foerster LLP

[57] ABSTRACT

An electric motor 12 and a gear head 13 are located in the space inside the take-up spool 5, an output shaft 13a of the gear head 13 formed such that it has a length that accommodates the engagement length of the take-up spool only is direct-coupled to the take-up spool 5, while an output gear 6 to receive the drive power for rewinding, etc., is formed as a single unit with the take-up spool 5. As a result of this construction, the amount of dead space above the take-up spool is reduced to the extent possible, the height of the camera is reduced, and the camera is made more compact.

12 Claims, 5 Drawing Sheets

FILM DRIVE MECHANISM

This application is based on application No. Hei 9-251876 filed in Japan, the content of which is hereby incorporated by reference.

BACKGROUND OF THE INVENTION

1. Field of the Invention

The present invention pertains to a film drive mechanism that performs winding and rewinding of film housed in a camera, and more particularly to a film drive mechanism that allows the camera to be reduced in size and allows the drive mechanism construction to be simplified.

2. Description of the Related Art

A film drive mechanism using a method in which the film housed in the camera is wound by transmitting the drive power from the motor to the film take-up spool by means of an appropriate reduction mechanism is conventionally known. The film drive mechanism using this type of take-up spool drive method is superior to a mechanism using a method in which the film is wound by transmitting the motor drive power to a sprocket, in that it has a simpler construction and the camera can be made smaller by locating the motor in the space inside the take-up spool Various examples of the prior art as described below have been proposed.

In Japanese Laid-Open Patent Application Sho 62-157018, (hereinafter the 'first example of the prior art'), a construction is proposed in which a motor is located inside a take-up spool in a single lens reflex camera, and driving of the mirror drive mechanism, the film winding mechanism, the shutter charging mechanism, etc., are all performed simultaneously by this motor.

In U.S. Pat. No. 5,262,810 (Japanese Laid-Open Patent Application Hei 5-80396) (hereinafter the 'second example of the prior art', a construction is proposed in which the take-up spool contains not only the motor, but also (i) a reduction system that transmits the output of the motor to the take-up spool, and (ii) a sliding clutch mechanism to prevent excessive force from being applied to the film or the reduction system gears when the film is being removed from the film take-up spool.

In Japanese Laid-Open Patent Application Hei 6-317832 (hereinafter the 'third example of the prior art', a construction is disclosed in which the motor is located inside the take-up spool, a reduction system is located outside one end of the take-up spool, and the drive power from the motor is transmitted to the take-up spool by means of the reduction system.

There has been increasing recent demand to make cameras smaller in order to improve their portability, and this, together with the need to further reduce the number of parts in order to achieve the goal, has made it necessary to eliminate dead space in the camera body to the extent possible.

However, because the first example of the prior art is constructed such that it is equipped with, in addition to the motor located inside the take-up spool, an upper unit that has a reduction gear train and is located on the upper part of the take-up spool, as well as a lower unit and a side unit to which the output from the motor is transmitted via a rotation transmission shaft, the height and width of the camera body cannot be reduced.

In the second example of the prior art, the camera body is made compact by locating not only the motor but also the reduction system and the clutch mechanism inside the take-up spool, but because there is no transmission gear mechanism on the take-up spool to externally transmit the motor power, and an essentially round elastic member comprising a part of the sliding clutch mechanism is mounted to the mechanism, it is difficult to add the gear mechanism, and moreover the height of the camera body cannot be reduced due to the existence of the essentially round elastic member.

In the case of the third example of the prior art, while a rewind mechanism is incorporated in the winding mechanism, because only the motor is located inside the take-up spool, and all the gears comprising the reduction system are located outside the take-up spool and are stacked along the axis of the take-up spool it is extremely difficult to reduce the height of the camera body.

As a means to resolve these problems, a mechanism shown in FIG. 6 as a comparison example has been considered, in which a take-up spool 5' is rotatably located inside a spool compartment 3 inside the camera body 1, an electric motor 12 as a drive source and a gear head 13 comprising a reduction system are incorporated in this take-up spool 5', an output gear 6' is mounted to an output shaft 13a that belongs to the gear head 13 and protrudes from the take-up spool 5', a transmission gear 15 located outside the take-up spool 5' engages with the output gear 6', and a spool gear 16 located outside and near the top end of the take-up spool 5' engages with the transmission gear 15, such that the output from the gear head 13 is received by the transmission gear 15, thereby driving the take-up spool 5' from the outside.

Unlike the third example of the prior art, in a non-direct coupling transmission type film drive mechanism of this sort in which the output from the drive source is transmitted to the take-up spool 5' by means of the transmission gear 15, the gear head 13 comprising a reduction system and the electric motor 12 can be located in the space inside the take-up spool and the rewind output to the film housing member in which a film cartridge is placed can be received from the transmission gear 15, while the mechanism offers the further advantage that the height of the camera can be reduced.

However, using this construction, because a space having height a1 greater than the thickness of the output gear 6' and the spool gear 16 must be located above the spool compartment 3, the height b1 from the center of the camera lens inevitably increases, and consequently not only does the dead space formed at the top of the camera increase, but also the number of parts cannot be reduced.

FIG. 7 shows a construction in which the comparison example of FIG. 6 is further improved The film drive mechanism shown in FIG. 7 is constructed such that, as in the example of FIG. 6, the take-up spool 5' is rotatably located inside the spool compartment 3, the electric motor 12 as a drive source and the gear head 13 are incorporated in this take-up spool 5', the output shaft 13a that belongs to the gear head 13 and protrudes from the take-up spool 5' is connected to a bearing hole 5'b formed in the take-up spool 5' by means of a key 14, the output gear 6' is pressed against and engaged with the output shaft 13a of the gear head 13, and an initial gear 8e of the transmission gear train located outside the take-up spool is engaged with the output gear 6'.

In this construction, the output from the gear head 13 is directly transmitted to the take-up spool 5' via the key 14 and the output to the film housing member is received from the output gear 6', which offers the advantage over the non-direct coupling transmission type mechanism shown in FIG.

6 that the amount of dead space above the spool compartment can be reduced.

However, because the output gear 6' is pressed against the output shaft 13a of the gear head 13, the output gear 6' must be a separate member from the take-up spool 5', and because there must be a space having the height a2 above the spool compartment 3 that is larger than the thickness of the output gear 6' because it has to accommodate the length of the engagement between the bearing hole 5'b of the take-up spool 5' and the key 14 and the space in which the output gear 6' is inserted, the height b2 from the center of the lens of the camera body 1 inevitably increases. Therefore, there is a limit to the extent to which the amount of dead space can be reduced.

SUMMARY OF THE INVENTION

The object of the present invention is to provide a film drive mechanism for a camera having a film winding and rewinding mechanism, in which the obstacles to making the camera compact are eliminated to the extent possible and which is more compact and has fewer parts.

In order to attain the object, the film drive mechanism of the present invention has a drive source having an output shaft to drive a driven members; and a spool in which the drive source is housed and which is direct-coupled to the output shaft of the drive source and that is formed as a single unit with an output gear.

BRIEF DESCRIPTION OF THE DRAWINGS

These and other objects and features of this invention will become dear from the following description, taken in conjunction with the preferred embodiments with reference to the accompanied drawings in which.

DETAILED DESCRIPTION OF THE PREFERRED EMBODIMENT

Figure 1:
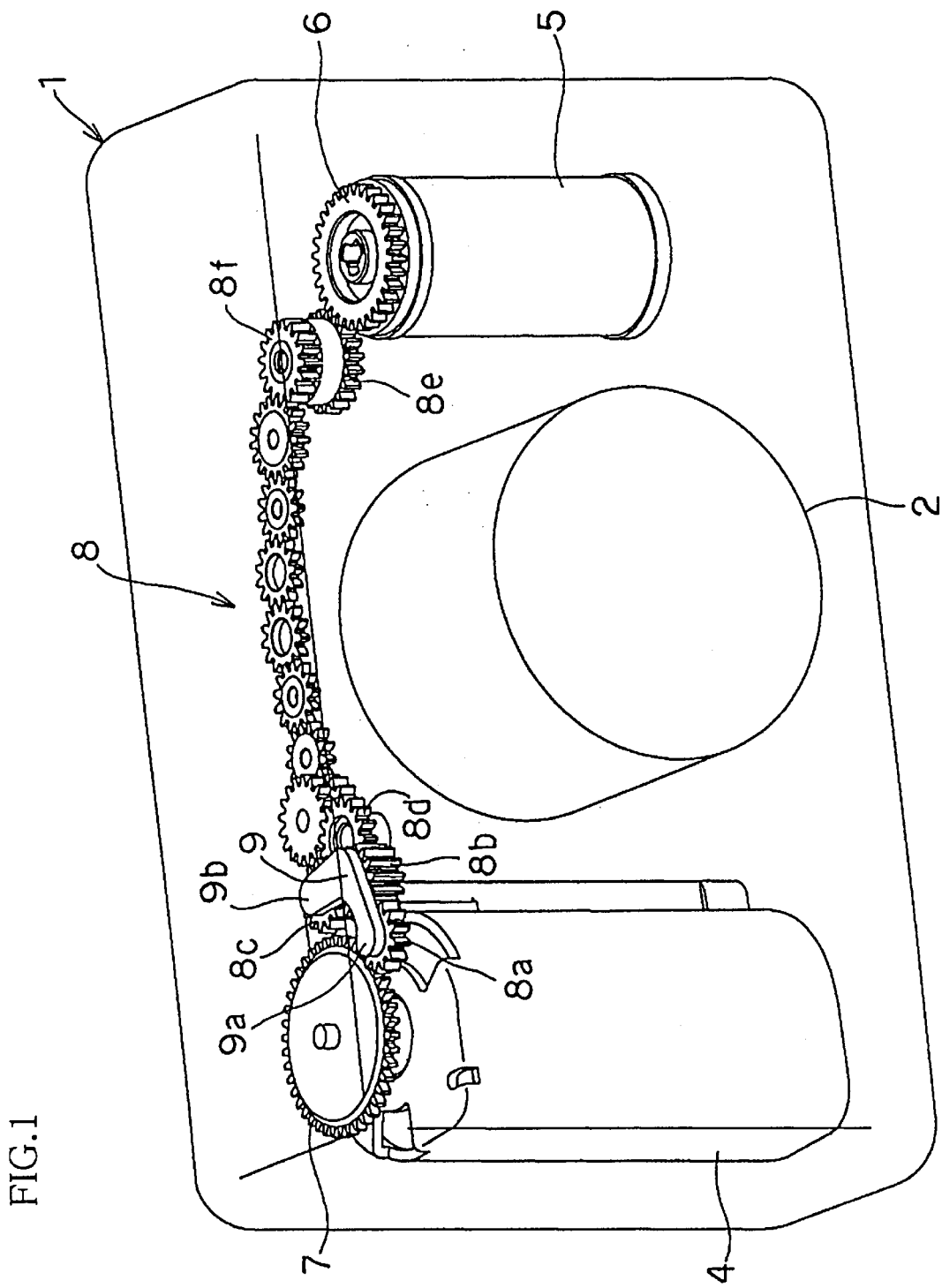
FIG. 1 is a perspective view showing the overall construction of the film drive mechanism pertaining to one embodiment of the present invention.
Figure 2:
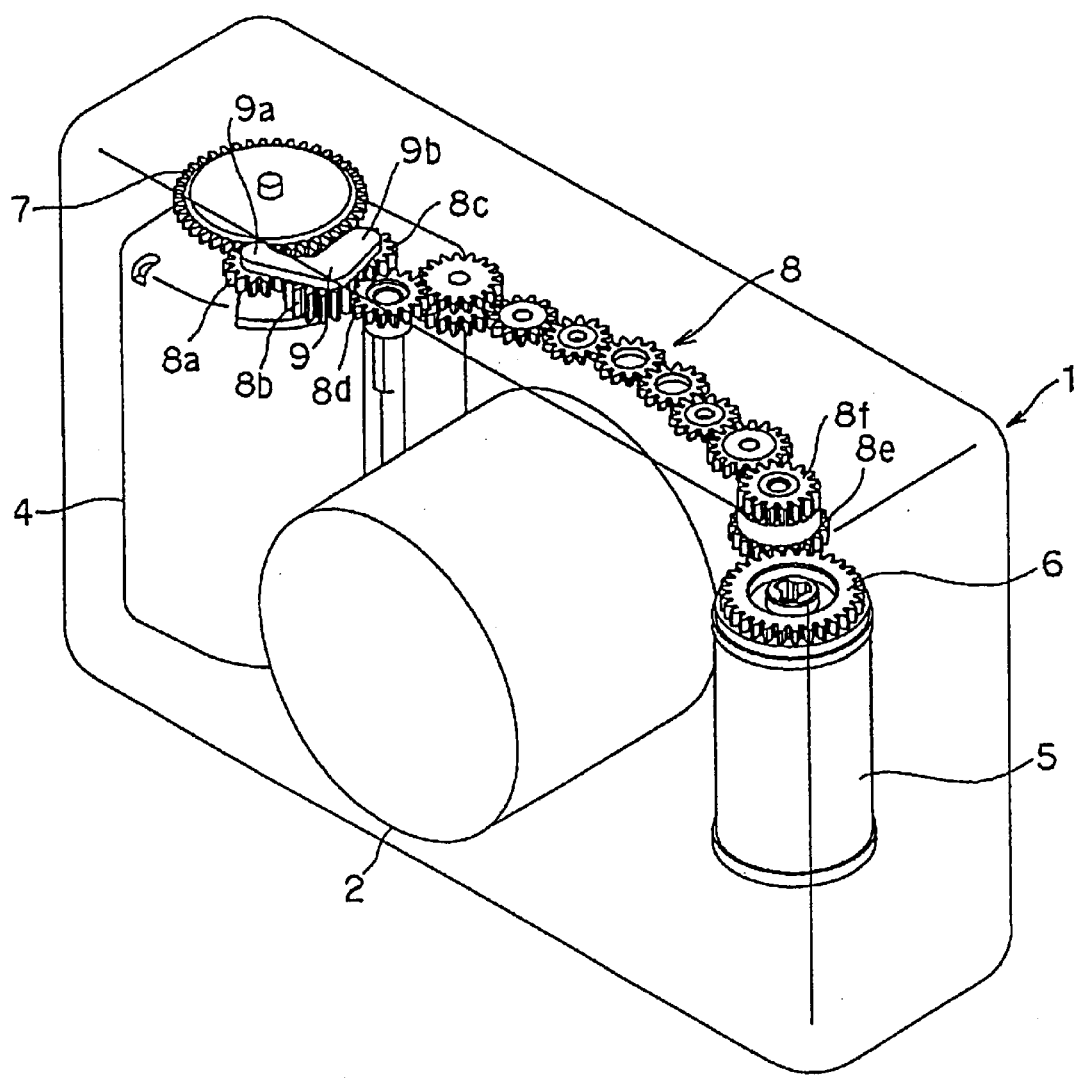
FIG. 2 is a perspective view of the film drive mechanism viewed from a different angle.
Figure 3:
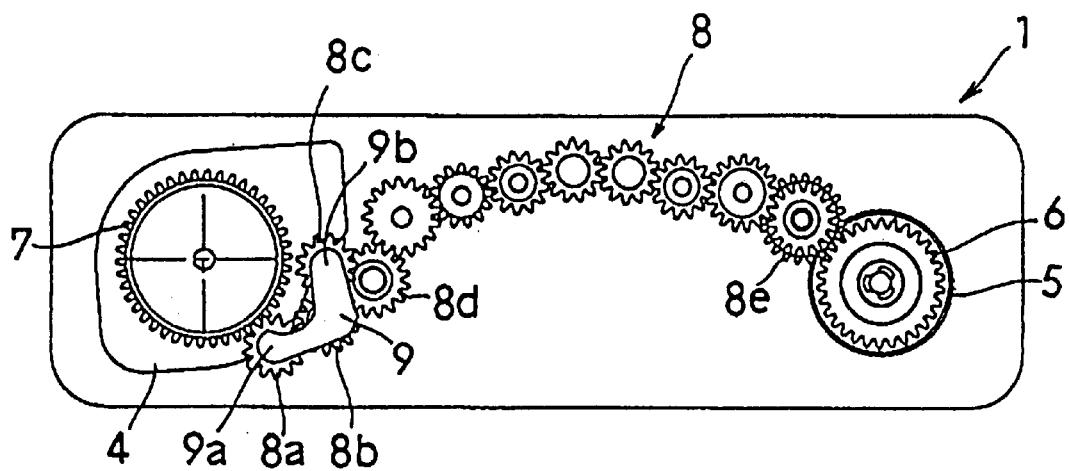
FIG. 3 is a plan view of the film drive mechanism.
Figure 4:
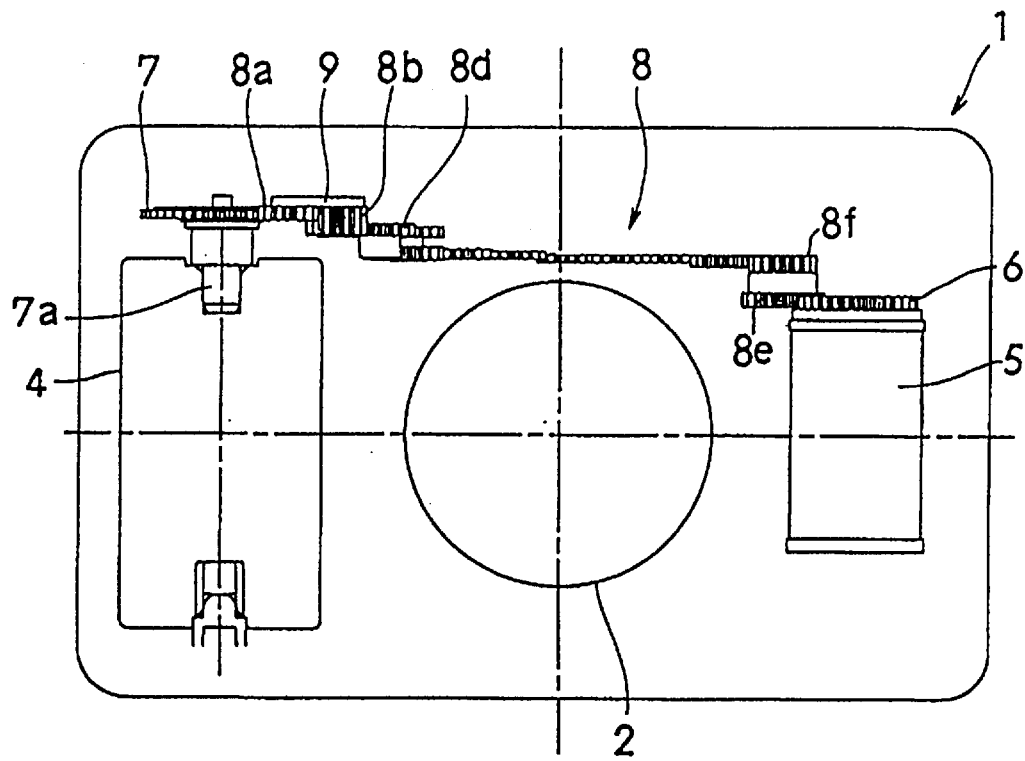
FIG. 4 is a front elevation of the film drive mechanism.
Figure 6:
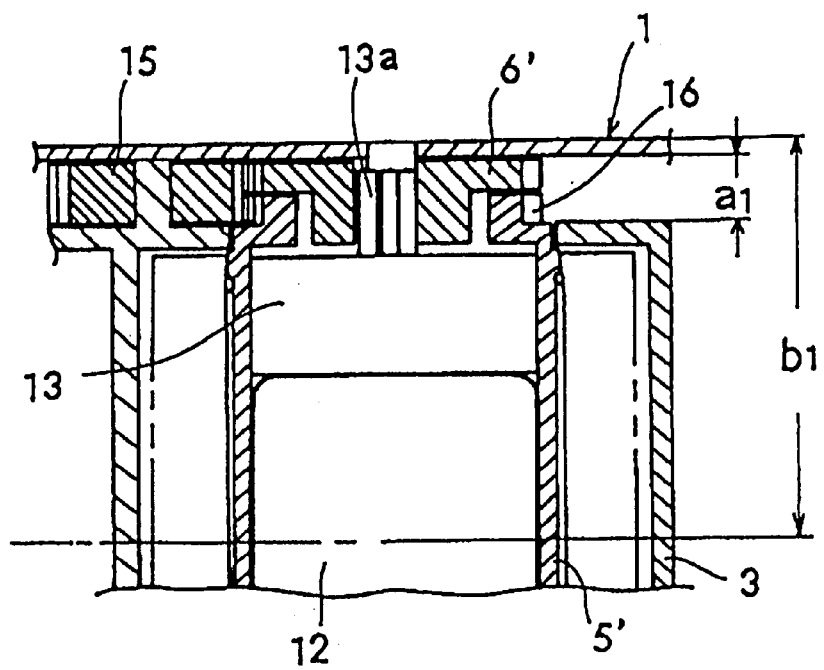
FIG. 6 is an enlarged cross-sectional view of the take-up spool portion of a comparison example.
Figure 7:
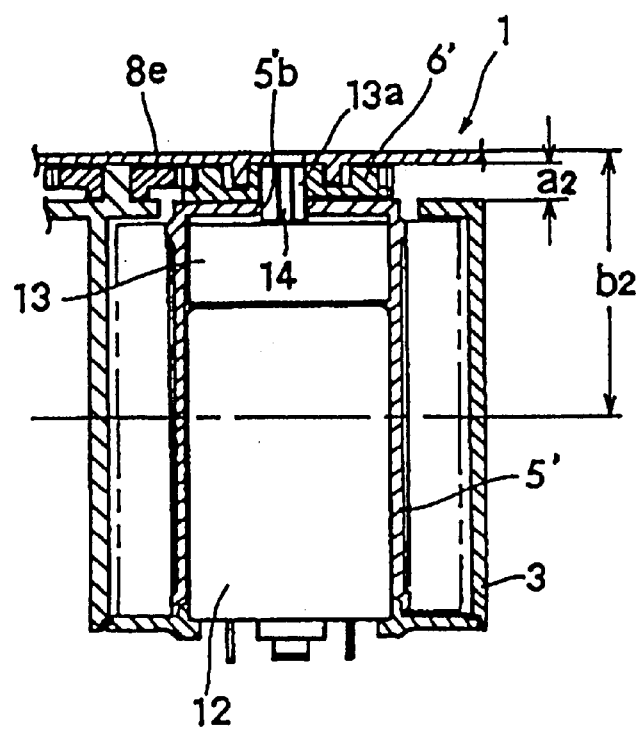
FIG. 7 is a cross-sectional view of the take-up spool portion of an improved version of the example shown in FIG. 6.

An embodiment of the present invention will be explained below with reference to FIGS. 1 through 5. FIGS. 1 through 4 show the overall construction of the film drive mechanism pertaining to this embodiment. FIGS. 1 and 2 show exterior views, FIG. 3 shows a plan view and FIG. 4 shows a front elevation of the mechanism. In this embodiment, parts having the same construction and operation as those in the comparison examples explained above with reference to FIGS. 6 and 7 are designated by the same numbers.

As shown in FIGS. 1 through 4, in the camera body 1, a spool compartment 3 (see FIG. 5) is located to one side of the image recording lens 2 and a cartridge bay not shown in the drawings is located to the other side. The film pushed out of the cartridge 4 housed in the cartridge bay passes the image recording lens 2 and is wound around a take-up spool 5 located inside the spool compartment 3.

The power transmission means of the film drive mechanism of this embodiment comprises an output gear 6 located above the take-up spool 5, a terminal gear 7 located above the cartridge bay that houses the cartridge 4, and a transmission gear train 8 located between the output gear 6 and the terminal gear 7, and a planet gear mechanism is located at the terminal gear 7 side of the transmission gear train 8. In addition, a fork 7a that rotates as one unit with the terminal gear 7 and engages with the spool of the cartridge 4 housed in the cartridge bay is located below the terminal gear 7.

The planet gear mechanism comprises a solar gear 8b, a carrier 9 rotatably supported around the same rotational axis as the solar gear 8b, a planet gear 8a supported by one arm 9a of the carrier 9, and a planet gear 8c supported by the other arm 9b of the carrier 9. The solar gear 8b and the carrier 9 are connected via light fiction, such that when the solar gear 8b rotates, the carrier 9 rotates in the same direction as the solar gear 8b. When this occurs, the planet gears 8a and 8c move around the solar gear 8b while staying engaged with it. As a result of this construction, the film is fed forward as described below.

When the output gear 6 rotates in the film feeding direction (clockwise in FIG. 3) while the cartridge 4 that houses the tip of the film is housed in the cartridge bay, a gear 8d of the transmission gear train 8 rotates in a counterclockwise direction in FIG. 3, and the solar gear 8b that is engaged with this gear 8d at all times rotates clockwise in the drawing. When this occurs, the carrier 9 also rotates clockwise and the planet gear 8a engages with the terminal gear 7. When the output gear 6 rotates further in this state, the terminal gear 7 and the fork 7a rotate clockwise in the drawing, and the film is fed out of the cartridge 4. When the tip of the film thus fed out reaches the spool compartment 3, the film is taken up by the take-up spool 5.

Here, the gear ratio of the transmission gear train 8 is set so that the film take-up speed of the take-up spool 5 is faster than the feeding out speed of he film coming out of the cartridge 4. Consequently, the film fed out of the cartridge bay has no slackness at the exposure position, and a flat film surface is maintained. When the film is pulled by the take-up spool 5, because the rotational speed transmitted to the terminal gear 7 from the take-up spool 5 via the film is faster than the rotational speed transmitted by the transmission gear train 8, the planet gear 8a is pushed downward in the drawing due to the clockwise rotation of the terminal gear 7, severing the linkage between the two gears.

On the other hand, when the output gear 6 rotates in the rewind direction (counterclockwise in FIG. 3) in order to rewind the film, the gear 8d of the transmission gear train 8 rotates clockwise in FIG. 3, and the solar gear 8b that is engaged with this gear 8d at all times rotates counterclockwise in the drawing. When this occurs, the carrier 9 also rotates counterclockwise and the planet gear 8c engages with the terminal gear 7. When the output gear 6 rotates further in this state, the terminal gear 7 and the fork 7a rotate counterclockwise in the drawing, and the film is rewound into the cartridge 4. Here, because the film rewind speed on the cartridge side is slower than the film release speed of the film take-up spool 5, film rewinding is performed while the film is being loosely wound out inside the spool compartment 3.

While omitted in the drawings, the multiple gears comprising the transmission gear train 8 may include a gear that leads to the drive transmission system for the shutter charging mechanism, such that each time film winding is performed, the shutter can be charged simultaneously.

Figure 5:
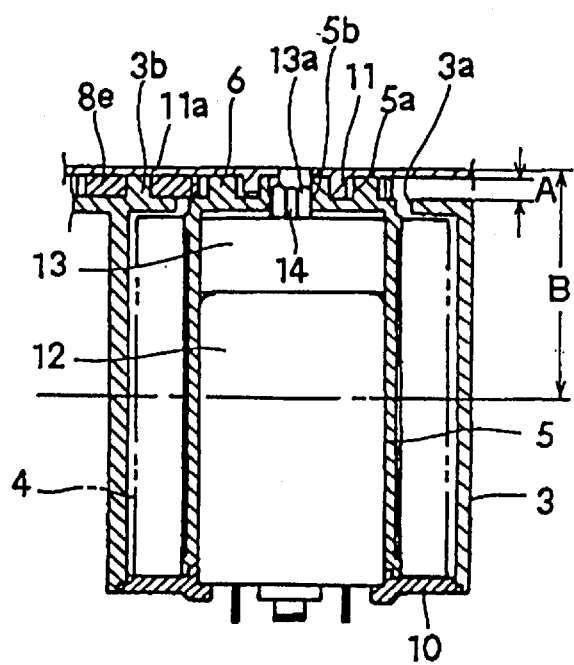
FIG. 5 is a cross-sectional view of the take-up spool portion.

FIG. 5 shows a cross-sectional view of the take-up spool area. As shown in the drawing, the spool compartment 3 has a cylindrical configuration with a diameter that can house the take-up spool 5 with the film from the cartridge 4 completely wound around it, and is formed as a single unit with the camera body 1. An opening 3a facing the take-up spool 5 is formed at its top end, while a bearing plate 10 that supports the take-up spool 5 is fixed at its bottom opening. A spool bearing 11 comprising a ring-shaped protrusion is located above the spool compartment 3 on the camera body 1 side.

The take-up spool 5 is formed in the shape of a hollow cylinder with a completely open bottom. The output gear 6 having a construction unique to this invention is formed as a single unit with the top end of the take-up spool 5, and a bearing groove 5a and bearing hole 5b are also formed around the same axis as the output gear 6. The spool 5 is placed in the center area of the spool compartment 3, with its bottom opening and the top bearing groove 5a rotatably supported by the bearing plate 10 and the spool bearing 11, respectively.

The drive source for the film drive mechanism comprises an electric motor 12 and a gear head 13 that functions as a reduction mechanism that reduces the speed of rotation of the electric motor 12. The electric motor 12 is located at the bottom of the empty space in the take-up spool 5 while the gear head 13 is located at the top of the empty space, and they are both situated so as not to hinder the rotation of the take-up spool 5. The electric motor 12 is fixed to the camera body 1 so that it is connected to the power source (not shown in the drawing) and the control system through the bottom opening of the take-up spool 5.

The output shaft 13a of the gear head 13 is linked, via the key 14 that functions as a linking means, to the center bearing hole 5b of the take-up spool 5 such that they rotate together. In addition, the rotational shaft 3b of the initial gear 8e of the transmission gear train 8 is formed near the opening 3a at the top wall of the spool compartment 3.

In FIG. 5, only the initial gear 8e of the transmission gear train 8 is shown, and the gear 8f that shares the same axis as the initial gear 8e is omitted, while a flat plate area 11a having a spool bearing 11 covers the top of the initial gear 8e. However, this drawing is used so that it can be easily contrasted with the comparison examples. In actuality, the flat plate area differs from that shown in FIG. 5, and is instead formed such that it can accommodate the transmission gear train 8 shown in FIGS. 1 through 4.

In the film drive mechanism of this embodiment constructed as described above, when a photo is taken, the electric motor 12 is driven to rotate appropriately so that the film advances by one frame at a time. After this rotation is reduced by the gear head 13, it is transmitted to the take-up spool 5, which thereby rotates and takes up the film, and is transmitted to the terminal gear 7 via the transmission gear train 8, thereby causing the film to be drawn out from the cartridge 4.

In the construction of this embodiment, because the output gear 6 is not separate from the take-up spool 5 but is formed as a single unit with it, the number of parts is reduced. Moreover, only the amount of space sufficient to accommodate the output gear 6, i.e., space having a height "A" comprising the thickness of the output gear 6, is necessary above the spool compartment 3, allowing the height of the space needed to be reduced as compared with the height a1 in the example shown in FIG. 6 or with the height a2 in the example shown in FIG. 7. Therefore, the height B from the center of the lens of the camera can also be less than the heights b1 and b2 of the comparison examples, thereby allowing the height of the camera to be reduced.

In this embodiment, the various gears of the gearing comprising the power transmission means, i.e. the gears comprising the transmission gear train 8 all the way to the terminal gear 7, are made of synthetic resin, and while it is desirable to make the take-up spool 5 and the output gear 6 out of synthetic resin as well, it is also acceptable to use metal.

As described above, because a mechanism is used that transmits the output from the drive source to the take-up spool and the rewind fork in order to perform film take-up and rewinding, where the output from the drive source is directly transmitted to the film take-up spool and the output gear is formed as a single unit with the take-up spool, the number of parts can be reduced to the extent that the output gear and the film take-up spool comprise a single component. As a further result, because the amount of dead space above the take-up spool can be reduced as much as possible, the volume of the entire camera and particularly the height of the camera can be reduced, and the camera may be made much more compact.

Obviously, many modifications and variation of the present invention are possible in light of the above teachings. It is therefore to be understood that within the scope of the appended claims, the invention may be practiced other than as specifically described

What is claimed is:

1. A film drive mechanism, comprising:
    a drive source comprising an output shaft to drive a driven member; and
    a spool for housing the drive source which is direct-coupled to the output shaft of the drive source through an opening in an end of the spool,
    wherein the spool is formed as a single unit with an output gear to transmit driving power to the driven member outside the spool.

2. A film drive mechanism as claimed in claim 1, wherein said drive source comprises a motor and a reduction mechanism which reduces revolution speed from the motor.

3. A film drive mechanism as claimed in claim 2, further comprising a linking member at a top wall of the spool, and via which an output of the output shaft is transmitted to the output gear.

4. A film drive mechanism as claimed in claim 1, further comprising a linking member at a top wall of the spool, and via which an output of the output shaft is transmitted to the output gear.

5. A film drive mechanism as claimed in claim 1, wherein an output of the output gear is transmitted to a film driving member through a transmission mechanism.

6. A film drive mechanism as claimed in claim 1, wherein the spool is a film take-up spool.

7. A camera comprising a film drive mechanism, comprising:
    a drive source comprising an output shaft;
    a spool for housing the drive source which is direct-coupled to the output shaft through an opening in an end of the spool;
    an output gear formed as a single unit with the spool to transmit driving power to a driven member outside the spool;

a linking member which engages with a spool shaft of a film cartridge housed in the camera; and a power transmission mechanism which links the output gear with the linking member.

8. A camera having a film drive mechanism as claimed in claim 7, wherein said drive source comprises a motor and a reduction mechanism which reduces revolution speed from the motor.

9. A camera having a film drive mechanism as claimed in claim 8, further comprising a linking member at a top wall of the spool, and via which an output of the output shaft is transmitted to the output gear.

10. A camera having a film drive mechanism as claimed in claim 7, further comprising a linking member at a top wall of the spool, and via which an output of the output shaft is transmitted to the output gear.

11. A camera having a film drive mechanism as claimed in claim 7, wherein an output of the output gear is transmitted to a film driving member through a transmission mechanism.

12. A camera having a film drive mechanism as claimed in claim 7, wherein the spool is a film take-up spool.

* * * * *